US012756501B2

(12) United States Patent
Tang

(10) Patent No.: US 12,756,501 B2
(45) Date of Patent: Oct. 6, 2026

(54) SCHEMES ON DISABLING HARQ FEEDBACK

(71) Applicant: MediaTek Singapore Pte. Ltd, Singapore (SG)

(72) Inventor: Wen Tang, Beijing (CN)

(73) Assignee: MediaTek Singapore Pte. Ltd, Singapore (SG)

( * ) Notice: Subject to any disclaimer, the term of this patent is extended or adjusted under 35 U.S.C. 154(b) by 330 days.

(21) Appl. No.: 18/383,515

(22) Filed: Oct. 25, 2023

(65) Prior Publication Data

US 2024/0146461 A1 May 2, 2024

(30) Foreign Application Priority Data

Oct. 27, 2022 (WO) ................ PCT/CN2022/127973
Oct. 23, 2023 (CN) ......................... 202311376649.9

(51) Int. Cl.

| | |
|---|---|
| ***H04L 1/1812*** | (2023.01) |
| ***H04L 1/1607*** | (2023.01) |
| ***H04W 72/1273*** | (2023.01) |
| ***H04W 72/232*** | (2023.01) |
| ***H04W 76/20*** | (2018.01) |

(52) U.S. Cl.

CPC .......... *H04L 1/1812* (2013.01); *H04L 1/1614* (2013.01); *H04W 72/1273* (2013.01); *H04W 72/232* (2023.01); *H04W 76/20* (2018.02)

(58) Field of Classification Search

CPC ........... H04W 72/232; H04W 72/1273; H04W 76/20; H04L 1/1812; H04L 1/1614; H04L 1/1822; H04L 1/1854; H04L 1/1864; H04L 1/1896

See application file for complete search history.

(56) References Cited

U.S. PATENT DOCUMENTS

2022/0053537 A1* 2/2022 Lei ........................ H04L 1/1816
2022/0109529 A1* 4/2022 Ye ......................... H04W 52/50
2022/0141861 A1* 5/2022 Rico Alvarino ...... H04L 12/189 370/312
2022/0322398 A1* 10/2022 Tsai ...................... H04L 1/1854
2022/0329363 A1* 10/2022 Lee ....................... H04L 5/0055
2022/0368475 A1* 11/2022 Lei ........................ H04L 1/1822
2023/0039872 A1* 2/2023 Khoshkholgh Dashtaki ............... H04W 72/1268
2024/0146461 A1* 5/2024 Tang .................. H04W 72/232
2024/0284461 A1* 8/2024 Tang ......................... H04L 1/08
2025/0193912 A1* 6/2025 Khoshkholgh Dashtaki ............... H04L 1/1864
2025/0260517 A1* 8/2025 Lin ....................... H04L 1/1812
2025/0343634 A1* 11/2025 Papasakellariou .... H04L 5/0055

* cited by examiner

*Primary Examiner* — Phong La

(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be an MT. The MT determines whether a first parameter is received from a base station via radio resource control (RRC) signaling. The first parameter comprises a bitmap. The bitmap indicates one or more processes, of a group of hybrid automatic repeat request (HARQ) processes, that are to be in a feedback state of disabled or enabled. When the first parameter is received, the MT disables or enables feedback of the one or more processes according to the bitmap.

18 Claims, 8 Drawing Sheets

SCHEMES ON DISABLING HARQ FEEDBACK

CROSS-REFERENCE TO RELATED APPLICATION(S)

This application claims the benefits of PCT Application Number PCT/CN2022/127973, entitled "SCHEMES ON DISABLING HARQ FEEDBACK IN IOT" and filed on Oct. 27, 2022, which is expressly incorporated by reference herein in their entirety.

BACKGROUND

Field

The present disclosure relates generally to communication systems, and more particularly, to techniques of enabling or disabling feedback of Hybrid Automatic Repeat reQuest processes at a mobile termination (MT).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an MT. The MT determines whether a first parameter is received from a base station via radio resource control (RRC) signaling. The first parameter comprises a bitmap. The bitmap indicates one or more processes, of a group of hybrid automatic repeat request (HARQ) processes, that are to be in a feedback state of disabled or enabled feedback. When the first parameter is received, the MT disables or enables feedback of the one or more processes according to the bitmap.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
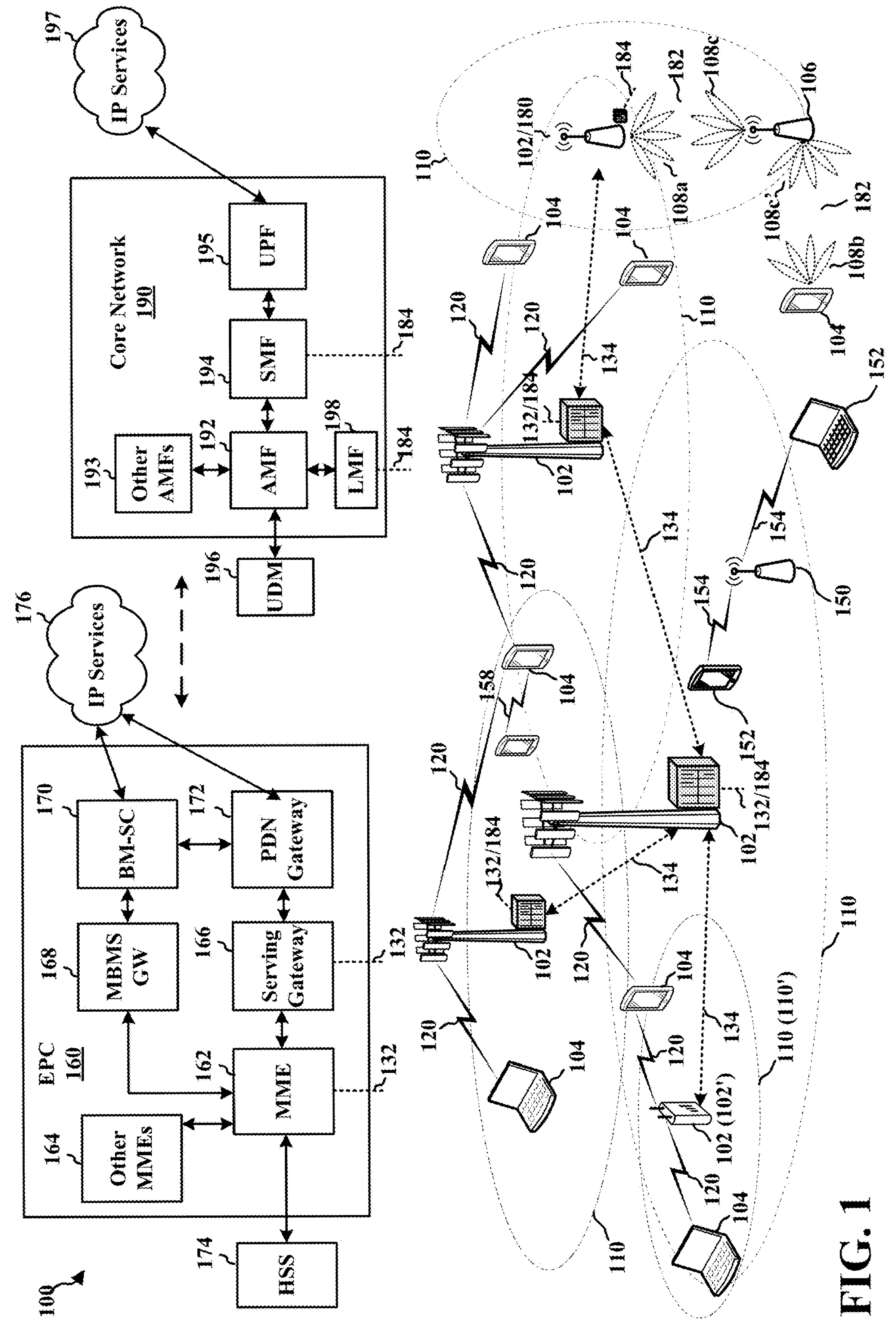
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
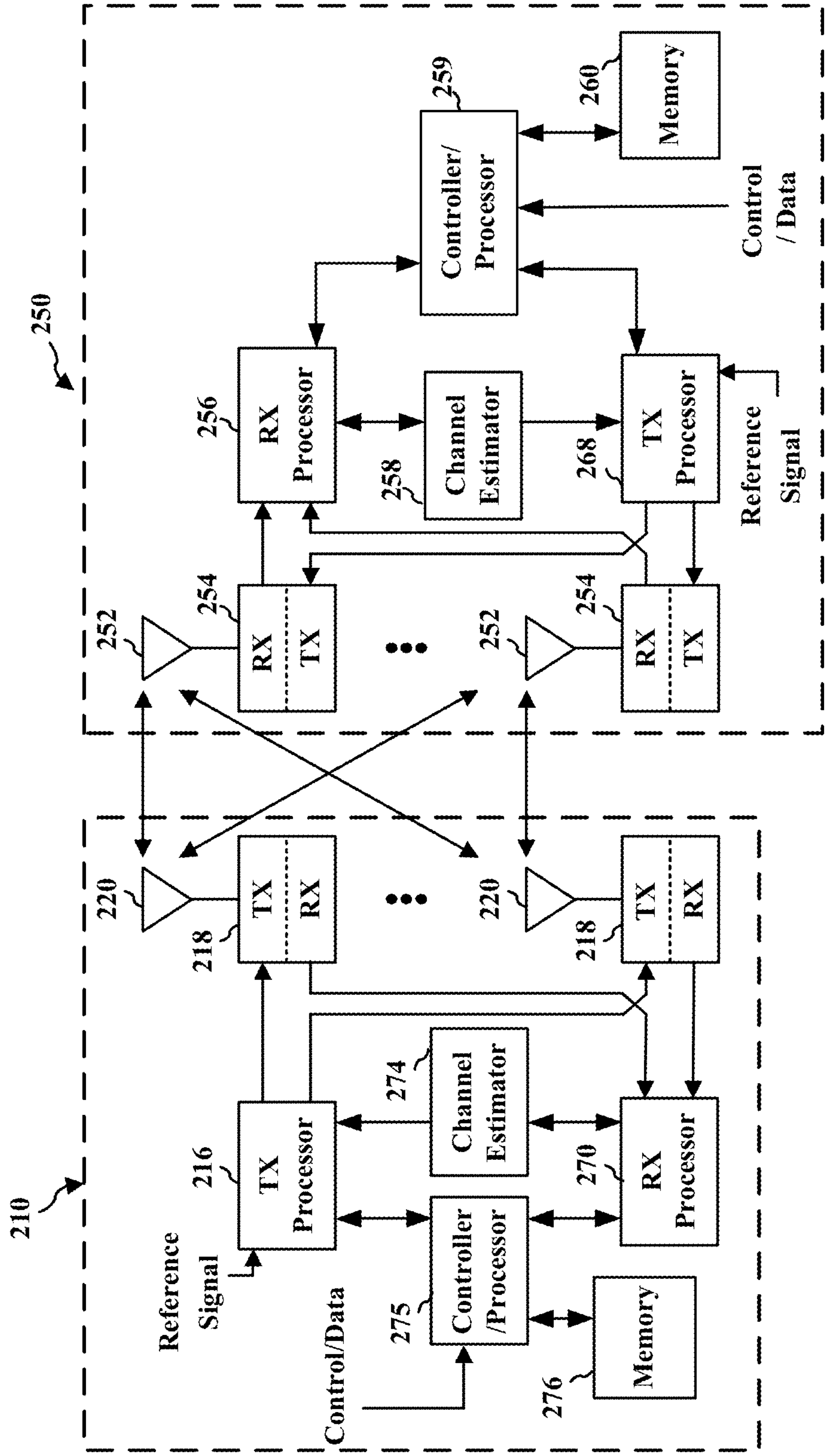
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms.

Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
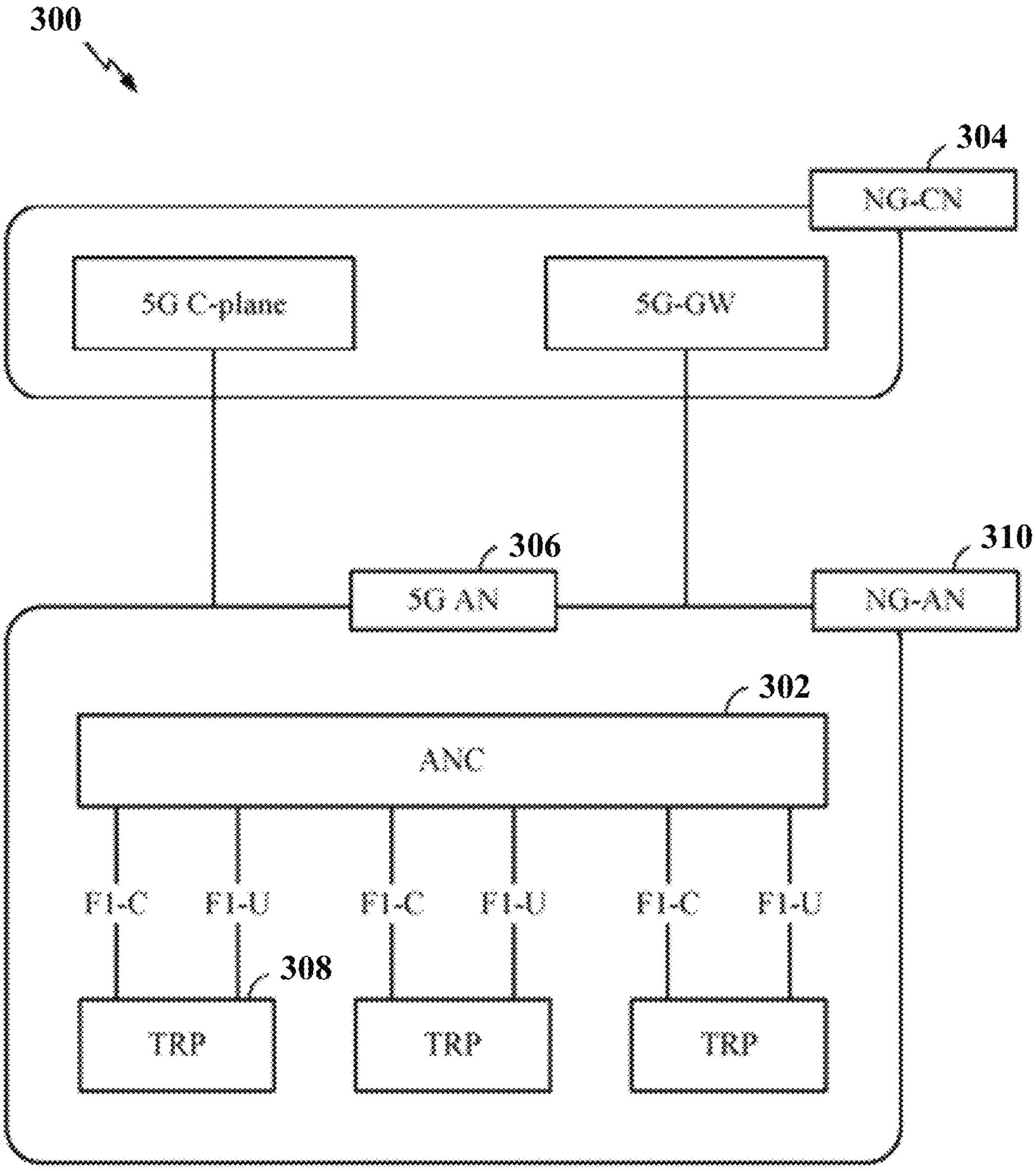
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with “cell.”

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
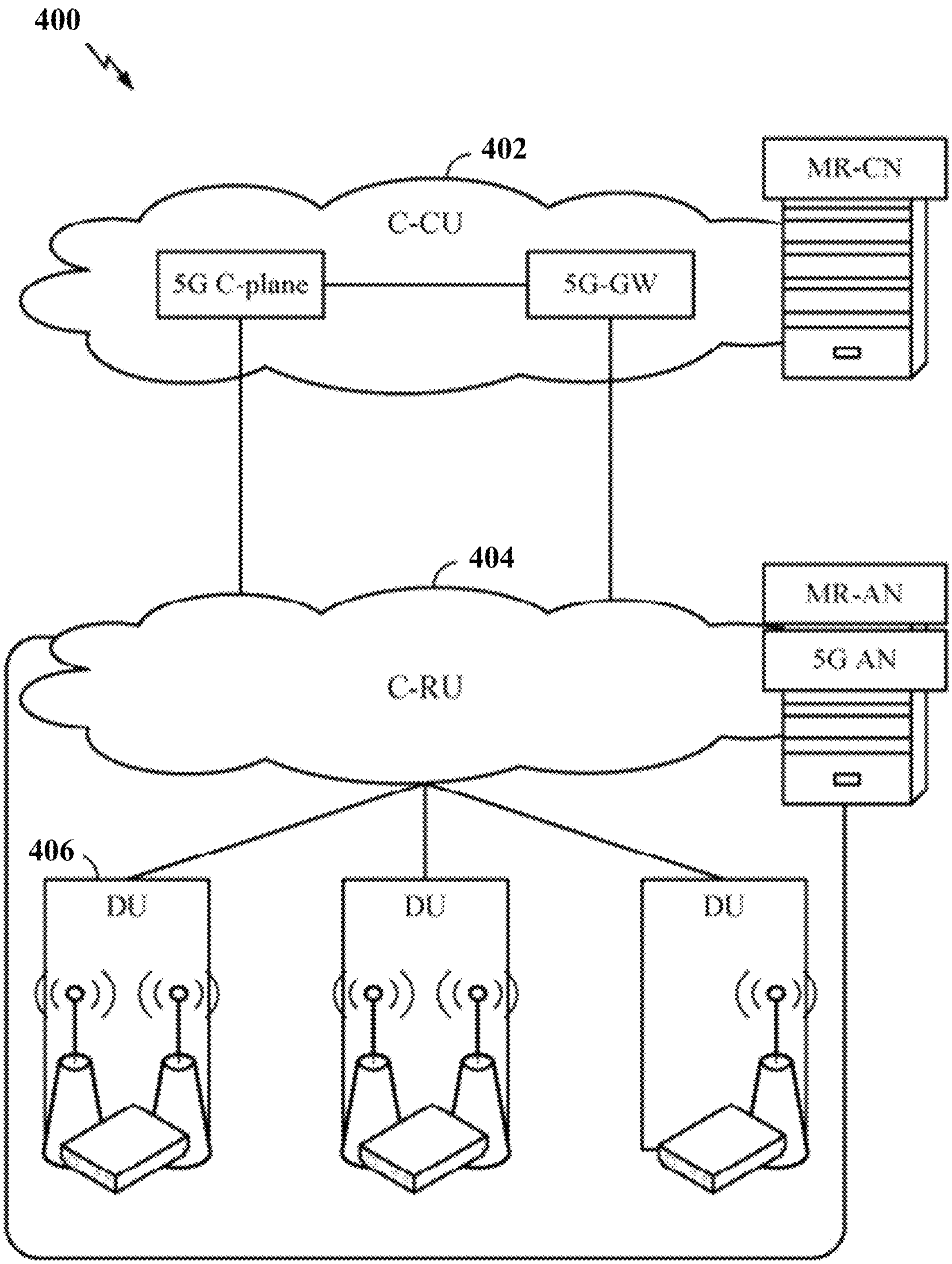
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
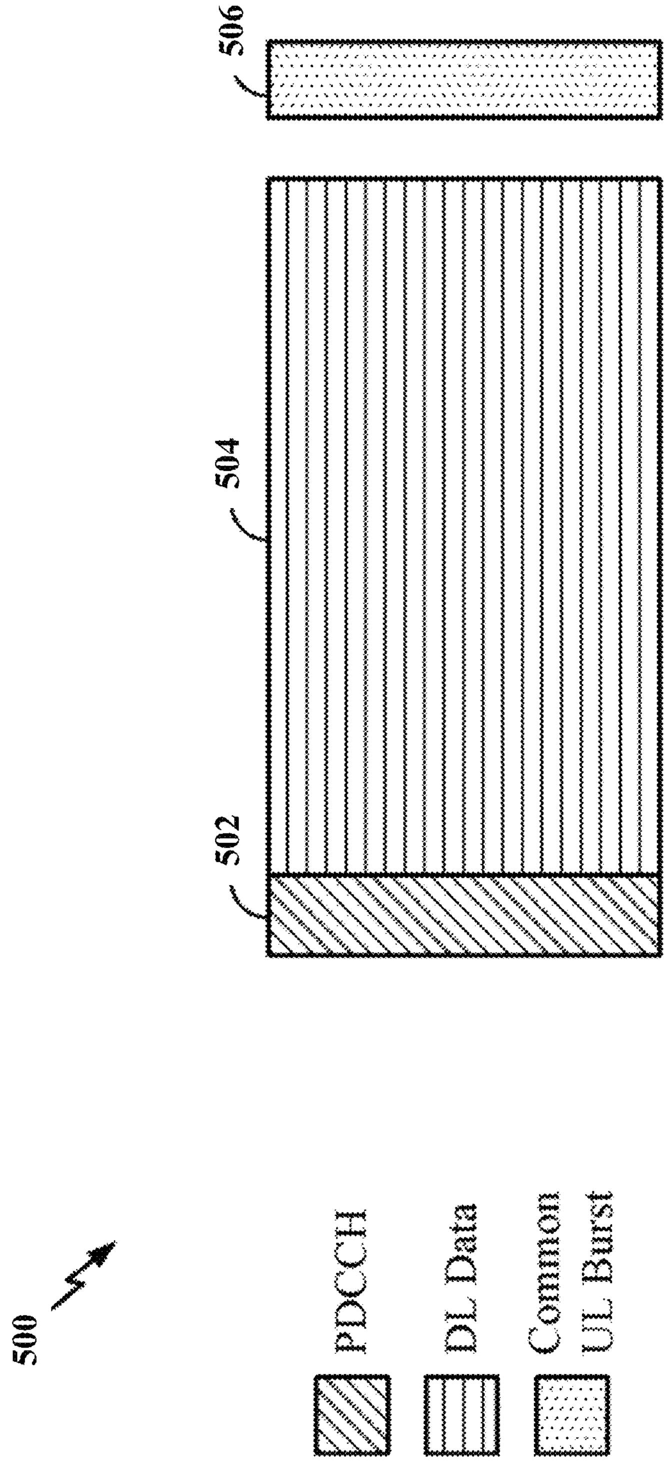
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
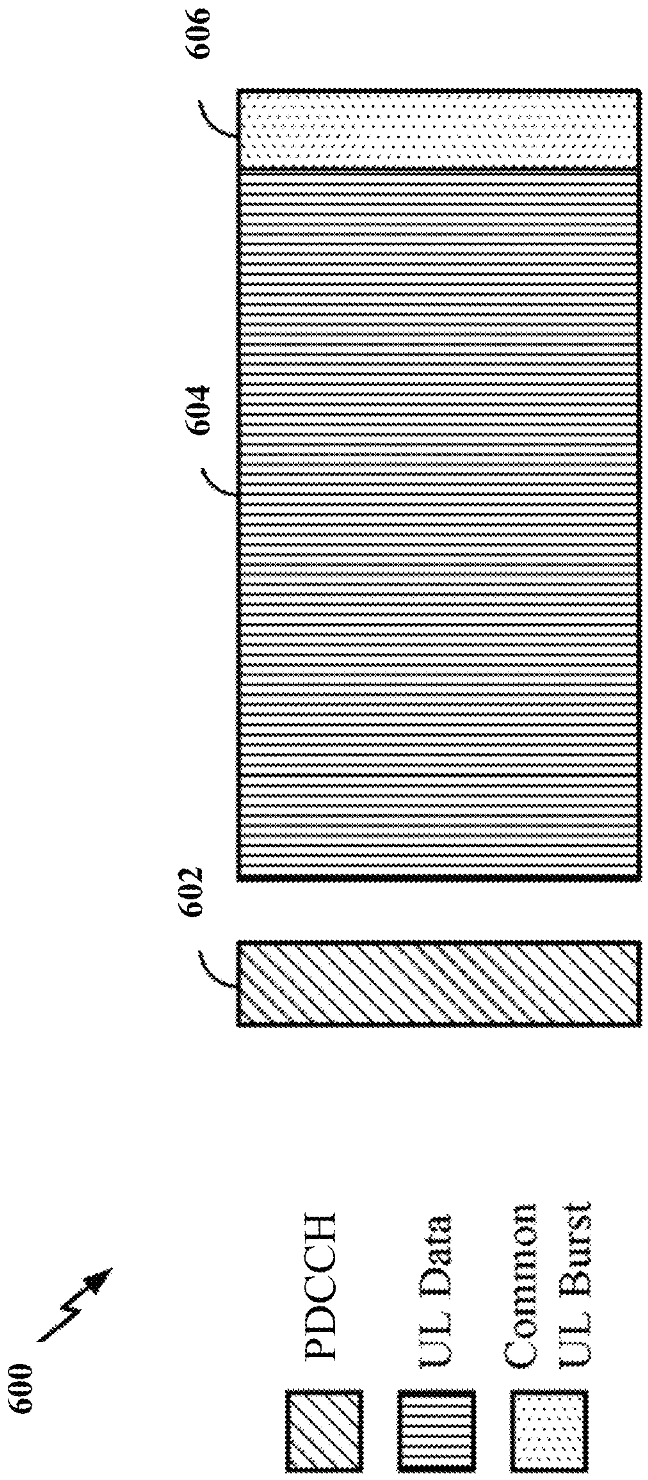
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
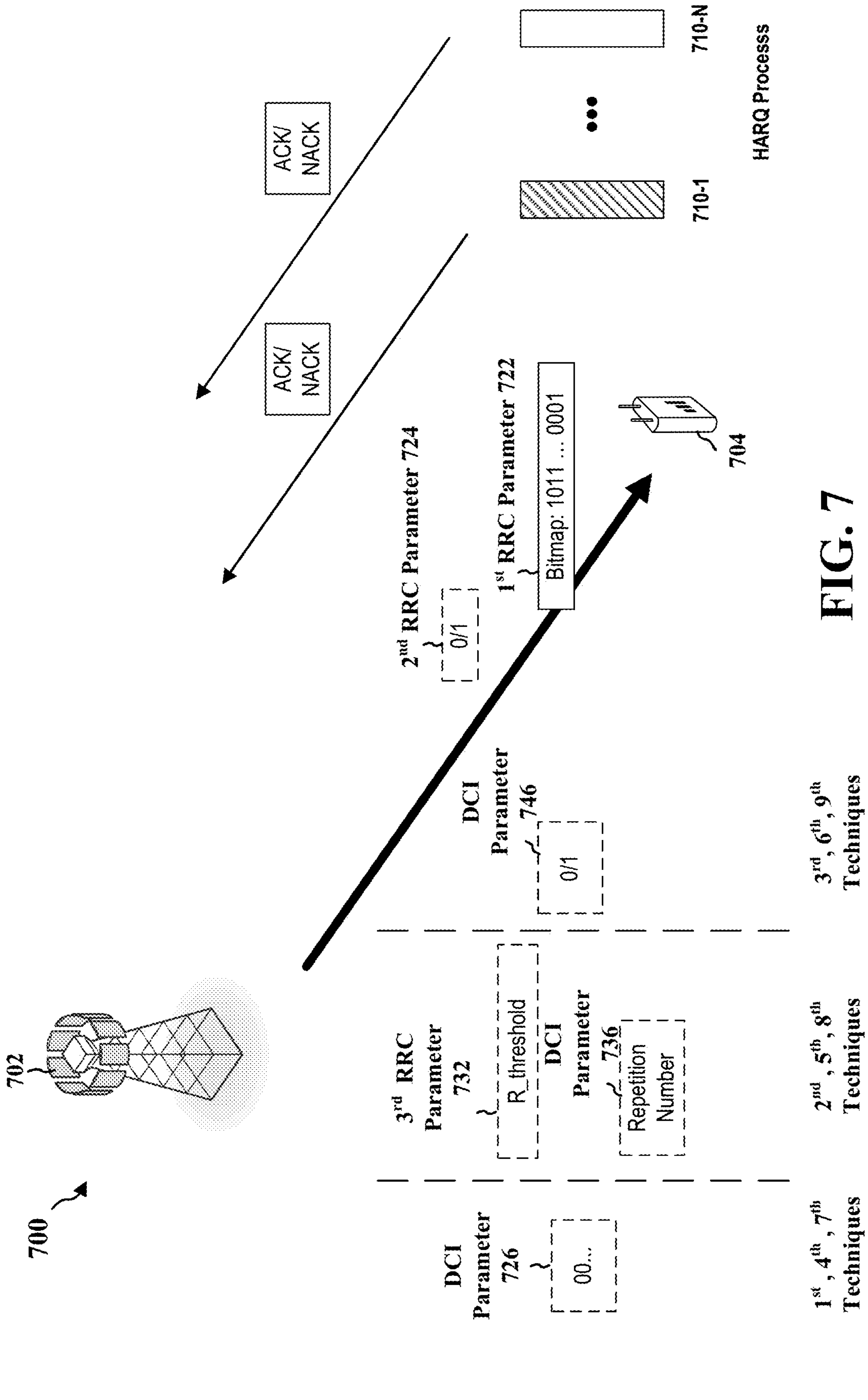
FIG. 7 is a diagram illustrating communications between a base station and a mobile termination (MT).

FIG. 7 is a diagram 700 illustrating communications between a base station 702 and a mobile termination (MT) 704. The MT 704 may be a UE, a Narrowband Internet of Things (NB-IoT) device, or an Enhanced Machine Type Communications (eMTC) device. In this example, the MT 704 is configured to implement Hybrid Automatic Repeat reQuest (HARQ) processes 710-1, . . . , 710-N. A HARQ process refers to the mechanism of transmitting data from a transmitter to a receiver and receiving acknowledgments in cellular networks. Data transmission from the base station 702 to the MT 704 is divided into multiple HARQ processes. Each HARQ process has its own sequence number and memory for combining retransmissions.

The base station 702 assigns a HARQ process ID when transmitting data to the MT 704. This HARQ process ID is signaled to the MT 704 in the downlink control information (DCI) that schedules the data transmission. When the MT 704 receives the downlink data transmission, it extracts the HARQ process ID from the associated DCI. The MT 704 uses the HARQ process corresponding to the HARQ process ID for operations such as soft combining retransmissions, maintaining ACK/NACK state, etc. The MT 704 then sends acknowledgments (ACK/NACK) on the corresponding HARQ process ID to confirm successful or failed reception.

Currently, in scenarios with relatively small transmission delays, such as terrestrial networks (TNs), using Hybrid Automatic Repeat reQuest (HARQ) feedback has many advantages such as improving transmission reliability. However, in scenarios with relatively large transmission delays, such as non-terrestrial networks (NTNs), disabling HARQ feedback can reduce user equipment (UE), Narrowband Internet of Things (NB-IoT) device and enhanced machine type communications (eMTC) device power consumption and transmission delay. Additionally, in scenarios with large round-trip time (RTT), disabling HARQ feedback for downlink (DL) transmission can increase uplink (UL) throughput, as the available UL resources will be greater in this case.

Based on different system bandwidths and coverage ranges, IoT systems can be mainly divided into Narrowband Internet of Things (NB-IoT) and Enhanced Machine Type Communications (eMTC). NB-IoT uses a bandwidth of about 200 kHz and supports transmission of low-traffic data rates below 100 kbps. The eMTC technology uses a 1.4 MHz bandwidth with a maximum data transmission rate of 1 Mbps. Further, in the NB-IoT scenario, the downlink supports 1 or 2 HARQ processes, while in the eMTC scenario, the downlink supports up to 14 HARQ processes for enhanced Machine Type Communications coverage enhancement mode A (eMTC CEModeA) and up to 4 HARQ processes for eMTC CEModeB.

When Internet of Things (IoT) devices and enhanced machine-type communication (eMTC) devices need to be used in large delay scenarios, HARQ feedback may need to be disabled to reduce transmission delay and increase throughput.

To configure the disabling of HARQ feedback of the MT 704, the base station 702 can send feedback configuration information to the MT 704. This feedback configuration information includes one or more parameters that indicate whether HARQ feedback is enabled or disabled for each of the HARQ processes 710-1, . . . , 710-N.

For example, the feedback configuration information may include a bitmap parameter sent via RRC signaling. Each bit in the bitmap corresponds to a HARQ process of the HARQ processes 710-1, . . . , 710-N and indicates whether HARQ feedback is enabled or disabled for that process. The bitmap allows selectively disabling HARQ feedback for only some of the HARQ processes.

The feedback configuration information may also include a parameter sent in DCI that overrides or directly indicates the HARQ feedback configuration for a particular scheduled transmission, regardless of the RRC bitmap configuration. For instance, a specific DCI field state could indicate that HARQ feedback is disabled for the transmission scheduled by that DCI.

The feedback configuration information may also include a predetermined threshold (R_threshold). During operation, the MT 704 will receive a DCI scheduling a downlink transmission, which will contain a repetition number field indicating how many repetitions are used for that transmission. The MT 704 will compare this repetition number to the configured R_threshold value. If the repetition number is greater than or equal to R_threshold, the MT 704 will determine that HARQ feedback should be disabled for that transmission. If the repetition number is less than R_threshold, the MT 704 will determine that HARQ feedback should be enabled.

With this feedback configuration information, the MT 704 can determine whether to enable or disable HARQ feedback for each of the HARQ processes 710-1, . . . , 710-N based on the RRC bitmap configuration and/or any DCI indications. Disabling HARQ feedback for some HARQ processes helps improve performance.

In a first technique, two RRC parameters are used along with reinterpreting the DCI field to indicate enabling or disabling of the feedback of each HARQ process.

The base station 702 configures a first RRC parameter 722 that may include a downlink HARQ feedback disabled bitmap. The first RRC parameter 722 may be cell-specific or UE-specific. This bitmap parameter configures HARQ feedback disabled or enabled of the HARQ processes 710-1, . . . , 710-N. Each bit corresponds to a HARQ process ID, with 1 indicating disabled and 0 indicating enabled.

This first RRC parameter 722 is configured via RRC signaling from the base station 702. In particular, the first RRC parameter 722 may be included in Msg4 during a random access procedure. Once the MT 704 completes the initial access and establishes a connection, it transitions to connected mode. In connected mode, the base station 702 can update the first RRC parameter 722 by sending a RRC Connection Reconfiguration message.

In certain configurations, the first RRC parameter 722 is HARQ feedback enabling-disabling per HARQ process. In certain configurations, for NB-IoT, the first RRC parameter 722 is downlinkHARQ-FeedbackDisabled-Bitmap-NB; for eMTC, the first RRC parameter 722 is downlinkHARQ-FeedbackDisabled-Bitmap. The first RRC parameter 722 may be 2 bits for NB-IoT and 14 bits for eMTC.

In certain configurations, the first/leftmost bit corresponds to HARQ process ID 0, the second/leftmost second bit corresponds to HARQ process ID 1, and so on. Further, if a HARQ process is not assigned a HARQ process ID by the base station 702, that HARQ process may use a default HARQ process ID 0 and may correspond to the first/leftmost bit of the first RRC parameter 722. In other words, the first/leftmost bit corresponds to the HARQ process without a configured HARQ process ID.

In this example, the bit(s) of the first RRC parameter are set to one identify HARQ processes with disabled DL HARQ feedback, and the bit(s) are set to zero identify HARQ processes with enabled DL HARQ feedback. In another example, zero may indicate disabled DL HARQ feedback and one may indicate enabled DL HARQ feedback.

Further, the base station 702 configures a second RRC parameter 724 that include a HARQ feedback enabling/disabling indication. The second RRC parameter 724 indicates whether the HARQ feedback enabling/disabling can be indicated by a DCI parameter 726 as described infra.

The second RRC parameter 724 may be cell-specific or UE-specific. This second RRC parameter 724 is configured via RRC signaling from the base station 702. In particular, the second RRC parameter 724 may be included in Msg4 during a random access procedure. Once the MT 704 completes the initial access and establishes a connection, it transitions to connected mode. In connected mode, the base station 702 can update the second RRC parameter 724 by sending a RRC Connection Reconfiguration message.

In certain configurations, the second RRC parameter 724 is HARQ feedback enabling-disabling indication. In certain configurations, for NB-IoT, the second RRC parameter 724 is downlinkHARQ-FeedbackDisabled-DCI-NB; for eMTC, the second RRC parameter 724 is downlinkHARQ-FeedbackDisabled-DCI. The second RRC parameter 724 may be 1 bit. Setting the second RRC parameter 724 to 1 indicates that enabling/disabling of HARQ feedback is determined based on DCI direct indication or DCI overriding, while setting the "HARQ feedback enabling-disabling indication" value to 0 indicates that enabling/disabling of HARQ feedback is determined based on the first RRC parameter 722, or is not determined based on DCI direct indication or DCI overriding.

Furthermore, when the second RRC parameter 724 is set to 1, it indicates that a DCI parameter 726 can be used to control HARQ feedback instead of the first RRC parameter 722. More specifically, in this example, when the base station 702 sends DCI to the MT 704 to schedule a particular downlink transmission, the base station 702 can configure a DCI parameter 726 in the DCI to override the bitmap of the first RRC parameter 722. In particular, the DCI also contains the HARQ process ID associated with that particular downlink transmission. The MT 704 can enable or disable feedback the HARQ process corresponding to the HARQ process ID according to the DCI parameter 726 contained in the DCI.

In this technique, for NB-IoT, the "HARQ-ACK resource" field in the DCI format is reinterpreted to carry the DCI parameter 726. In one example, the DCI parameter 726 is set to a particular feedback state (e.g., feedback state A) to indicate disabling of HARQ feedback for corresponding HARQ processes 710-1, . . . , 710-N. The feedback state A may be represented by value "0000" or "1111". The DCI parameter 726 is set to other feedback states or values to indicate enabling of HARQ feedback for corresponding HARQ processes 710-1, . . . , 710-N.

For eMTC CEModeA, the "TPC command for PUCCH" or "HARQ-ACK resource offset" fields in DCI format 6-1A is reinterpreted to carry the DCI parameter 726. For eMTC CEModeB, the "HARQ-ACK resource offset" field in DCI format 6-1B is reinterpreted to carry the DCI parameter 726. In one example, the DCI parameter 726 is set to a particular feedback state (e.g., feedback state A) to indicate disabling of HARQ feedback for corresponding HARQ processes 710-1, . . . , 710-N. The feedback state A may be represented by value '00' for TPC command and '00' or '11' for resource offset indicates disabling. The DCI parameter 726 is set to other feedback states or values to indicate enabling of HARQ feedback for corresponding HARQ processes 710-1, . . . , 710-N.

In other words, when the DCI parameter 726 is set to feedback state A in DCI scheduling a downlink transmission, if feedback of the process of the HARQ processes 710-1, . . . , 710-N receiving the downlink transmission has been disabled, the feedback of that HARQ process maintains being disabled. If the feedback of that HARQ process has been enabled, the feedback of that HARQ process is reversed to being disabled. When the DCI parameter 726 is set to any other feedback state, if the feedback of the process of the HARQ processes 710-1, . . . , 710-N receiving the downlink transmission is enabled, the feedback of that HARQ process maintains being enabled and indicates corresponding HARQ resource. If the feedback of that HARQ process has been disabled, the feedback of that HARQ process is reversed to being enabled and indicates corresponding HARQ resource.

In certain configurations, the base station 702 may have not configured the first RRC parameter 722 for the MT 704. Nonetheless, the base station configures the second RRC parameter 724 and configures the DCI parameter 726 in DCI scheduling a downlink transmission. When the second RRC parameter 724 is set to 1, enabling DCI direct indication, if the DCI parameter 726 is set to feedback state A, the feedback of the process of the HARQ processes 710-1, . . . , 710-N receiving the downlink transmission is disabled; if the DCI parameter 726 is set to any other feedback state, the feedback of the process of the HARQ processes 710-1, . . . , 710-N receiving the downlink transmission is enabled.

The MT 704 is configured with multiple HARQ processes 710-1, . . . , 710-N for receiving downlink transmissions from the base station 702. For uplink transmissions from the MT 704 to the base station 702, PUCCH for Msg4 may always have HARQ feedback enabled. The first RRC parameter 722, the second RRC parameter 724, the DCI parameter 726 are not applied to PUCCH for Msg4.

Further, when the second RRC parameter 724 is not configured by the base station 702, the HARQ feedback enabling/disabling is determined based on the first RRC parameter 722 if this parameter is configured by the base station 702.

Additionally, the first RRC parameter 722 can be updated by the Medium Access Control (MAC) Control Element (CE) in NB-IoT UP mode and eMTC connected mode.

In a second technique, the base station 702 configures the first RRC parameter 722 and the second RRC parameter 724 as described supra in the first technique.

Further, the base station 702 configures a third RRC parameter 732 that contains an R_threshold for the MT 704. The base station 702 configures this R_threshold parameter via RRC signaling. In particular, the third RRC parameter 732 may be included in Msg4 during a random access procedure. Once the MT 704 completes the initial access and establishes a connection, it transitions to connected mode. In connected mode, the base station 702 can update the third RRC parameter 732 by sending a RRC Connection Reconfiguration message.

The third RRC parameter 732 indicates the R_threshold value for NB-IoT, CEModeA and CEModeB respectively. The R_threshold value equals the maximum repetition number or a specific repetition number equaling an integer multiple of the maximum repetition number. Alternatively, the R_threshold value equals a specific repetition number selected from the range {1, 2, . . . , the maximum repetition number}. As another option, the R_threshold value equals the maximum field number in the "repetition number" field of the DCI. Or the R_threshold value equals a specific field number selected from the range 1, 2, . . . , the maximum field number in the DCI "repetition number" field. During operation, the MT 704 receives DCI from the base station 702 scheduling a particular downlink transmission. This DCI contains a DCI parameter 736 in "repetition number" field, indicating how many repetitions are used for the scheduled downlink transmission. The MT 704 compares the repetition number to the configured R_threshold value.

In certain configurations, if the repetition number is greater than or equal to R_threshold, the MT 704 determines that HARQ feedback should be enabled for the scheduled particular downlink transmission. If the repetition number is less than R_threshold, the MT 704 determines that HARQ feedback should be disabled for the scheduled particular downlink transmission. In other words, when the repetition number is greater than or equal to R_threshold, if the process of the HARQ processes 710-1, . . . , 710-N receiving the downlink transmission is enabled, the feedback of that HARQ process maintains being enabled and indicates corresponding HARQ resources. If the feedback of the process of the HARQ processes 710-1, . . . , 710-N receiving the downlink transmission is disabled, the feedback of that HARQ process is reversed to being enabled and indicates corresponding HARQ resources. When the repetition number is less than R_threshold, if the feedback of the process of the HARQ processes 710-1, . . . , 710-N receiving the downlink transmission has been disabled, the feedback of that HARQ process maintains being disabled. If the feedback of the process of the HARQ processes 710-1, . . . , 710-N receiving the downlink transmission is enabled, the feedback of that HARQ process is reversed to being disabled.

In certain configurations, if the repetition number is greater than or equal to R_threshold, the MT 704 determines that HARQ feedback should be disabled for the scheduled downlink transmission. If the repetition number is less than R_threshold, the MT 704 determines that HARQ feedback should be enabled for the scheduled downlink transmission.

This technique selectively disables HARQ feedback based on the relationship between the repetition number and R_threshold. When the repetition number is high, disabling HARQ feedback does not significantly improve the peak data rate. However, when the repetition number is low, disabling HARQ feedback can provide noticeable gains in peak data rate.

The base station 702 can configure the R_threshold value via RRC signaling. Alternatively, default R_threshold values can be defined for different scenarios. For example, the R_threshold value may default to 0100 for the DCI "repetition number" field.

In certain configurations, the base station 702 may have not configured the first RRC parameter 722 for the MT 704. Nonetheless, the base station configures the second RRC parameter 724 and the DCI parameter 736. When the second RRC parameter 724 is set to 1, enabling DCI direct indication, the feedback enable/disable status of the HARQ processes 710-1, . . . , 710-N are determined based on a comparison of the repetition number with R_threshold as described supra.

In a third technique, which is similar to the first technique, the base station 702 may configure the first RRC parameter 722 and the second RRC parameter 724 for the MT 704 as described supra with respect to the first technique. The base station 702 further configures a DCI parameter 746 for the MT 704 in DCI of a scheduled downlink transmission. However, instead of reinterpreting an existing DCI field such as HARQ-ACK resource to carry the DCI parameter 746 as in the first technique, the base station 702 uses an additional, dedicated field in the scheduling DCI to carry the DCI parameter 746. The DCI parameter 746 can be used to override the bitmap of the first RRC parameter 722 or directly indicate HARQ feedback enable/disable status. The additional, dedicated DCI field may be HARQ feedback enabling-disabling and may be one bit. In one example, the DCI parameter 746 is set to 0 to indicate that the feedback of the process of the HARQ processes 710-1, . . . , 710-N receiving the downlink transmission is enabled. The DCI parameter 746 is set to 1 to indicated that the feedback of the process of the HARQ processes 710-1, . . . , 710-N receiving the downlink transmission is disabled.

In a fourth technique, which is similar to the first technique, when the second RRC parameter 724 is set to 1, the DCI parameter 726 can be used to only override the bitmap of the first RRC parameter 722, but not to directly indicate HARQ feedback enable/disable status as in the first technique. The procedures of the first technique are incorporated here.

In a fifth technique, which is similar to the second technique, when the second RRC parameter 724 is set to 1, the DCI parameter 736 can be used to only override the bitmap of the first RRC parameter 722, but not to directly indicate HARQ feedback enable/disable status as in the second technique. The procedures of the second technique are incorporated here.

In a sixth technique, which is similar to the third technique, when the second RRC parameter 724 is set to 1, the DCI parameter 746 can be used to only override the bitmap of the first RRC parameter 722, but not to directly indicate HARQ feedback enable/disable status as in the third technique. The procedures of the third technique are incorporated here.

In a seventh technique, which is similar to the first technique, the base station 702 configures the first RRC parameter 722 and the DCI parameter 726 for the MT 704, but does not configure the second RRC parameter 724. Accordingly, the MT 704 may always override the bitmap of the first RRC parameter 722 according to the DCI parameter 726 as described supra with respect to the first technique.

In an eighth technique, which is similar to the second technique, the base station 702 configures the first RRC parameter 722 and the DCI parameter 736 for the MT 704, but does not configure the second RRC parameter 724. Accordingly, the MT 704 may always override the bitmap of the first RRC parameter 722 according to the DCI parameter 736 as described supra with respect to the second technique.

In a ninth technique, which is similar to the third technique, the base station 702 configures the first RRC parameter 722 and the DCI parameter 746 for the MT 704, but does not configure the second RRC parameter 724. Accordingly, the MT 704 may always override the bitmap of the first RRC parameter 722 according to the DCI parameter 746 as described supra with respect to the third technique.

Figure 8:
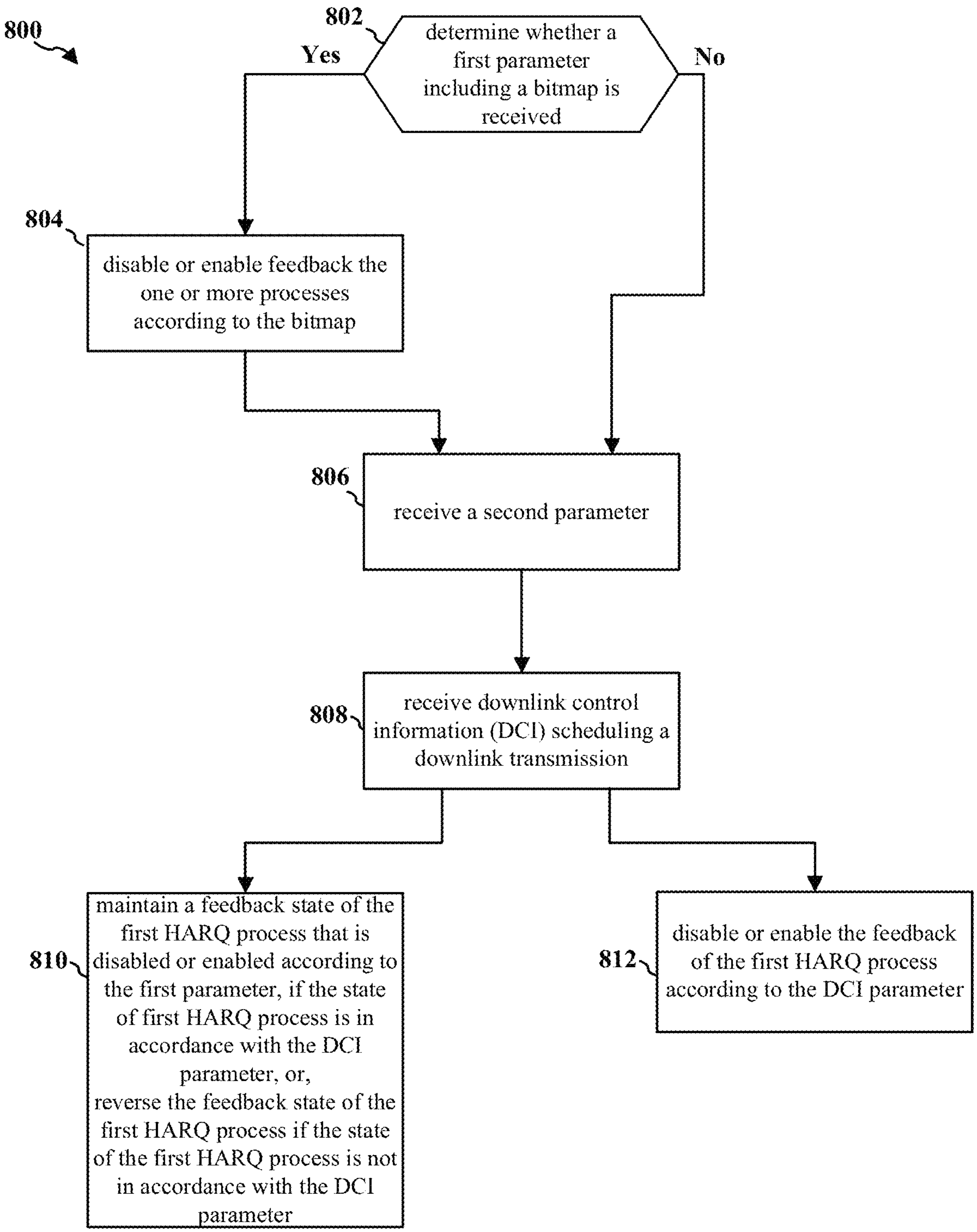
FIG. 8 is a flow chart of a method (process) for enabling/disabling feedback of HARQ processes.

FIG. 8 is a flow chart 800 of a method (process) for enabling/disabling feedback of HARQ processes. The method may be performed by a mobile termination (MT) such as a user equipment (UE) or Internet of Things (IoT) device (e.g., the UE 250, the MT 704). In operation 802, the MT determines whether a first parameter is received from a base station via radio resource control (RRC) signaling. The first parameter includes a bitmap indicating one or more processes, of a group of hybrid automatic repeat request (HARQ) processes, that are to be in a feedback state of disabled or enabled feedback.

In certain configurations, each bit of the bitmap may correspond to a respective process of the group of HARQ processes. An adjacent bit to the right of a given bit of in the bitmap corresponds to a HARQ process ID that is higher than a HARQ process ID corresponding to the given bit. In certain configurations, feedback of a HARQ process for acknowledging reception of Msg4 is always enabled and the bitmap of the first parameter does not apply to the HARQ process for acknowledging reception of Msg4.

If the first parameter is received, in operation 804, the MT disables or enables the feedback of the one or more processes according to the bitmap.

The MT may receive, from the base station, a second parameter configured via RRC signaling in operation 806. The second parameter indicates whether the first parameter including a bitmap can be overridden by a DCI parameter indicating enabling or disabling the feedback of a particular HARQ process or whether the DCI parameter is utilized. The first and second RRC parameters may be transmitted in a MSG4, a NPDSCH-Config-NB field for NB-IoT, or a PDSCH-Config field for eMTC. The first parameter and the second parameter may be updatable by MAC CE or updatable by RRC signaling when the MT is in NB-IoT UP mode and in eMTC RRC connected state. In certain configurations, feedback of a HARQ process for acknowledging reception of Msg4 is always enabled and the second parameter does not apply to the HARQ process for acknowledging reception of Msg4.

In operation 808, the MT may receive, from the base station, downlink control information (DCI) scheduling a downlink transmission. The DCI includes the DCI parameter that indicates to disable or enable the feedback of a first HARQ process for the downlink transmission. In certain configurations, feedback of a HARQ process for acknowledging reception of Msg4 is always enabled and the DCI parameter does not apply to the HARQ process for acknowledging reception of Msg4.

In certain configurations, the DCI parameter may be in a re-interpreted DCI field with another parameter. The re-interpreted DCI field may be "HARQ-ACK resource" field for Narrowband Internet of Things (NB-IoT) communications and may be "HARQ-ACK resource offset" field for enhanced Machine Type Communications coverage enhancement mode B (eMTC CEModeB) communications. A value of "11" in the "HARQ-ACK resource offset" may indicate disabling of the feedback of an associated HARQ process and other values in the "HARQ-ACK resource offset" field may indicate enabling of the feedback of the associated HARQ process. A value of "1111" in the "HARQ-ACK resource" may indicate disabling of the feedback of an associated HARQ process and other values in the "HARQ-ACK resource" field may indicate enabling the feedback of the associated HARQ process.

In certain configurations, the DCI parameter may be in a DCI field dedicated to the DCI parameter.

When the first parameter is received in operation 802, in operation 810, the MT maintains a feedback state of the first HARQ process that is disabled or enabled according to the first parameter, if the feedback state of first HARQ process is in accordance with the DCI parameter. The MT reverses the feedback state of the first HARQ process if the feedback state of the first HARQ process is not in accordance with the DCI parameter.

When the first parameter is not received in operation 802, the MT disables or enables the feedback of the first HARQ process according to the DCI parameter in operation 812.

In certain configurations, the MT may receive, from the base station, a threshold parameter configured via RRC signaling. The MT receives, from the base station, DCI scheduling a downlink transmission and including a repetition number. The MT disables feedback of a HARQ process for the scheduled downlink transmission when the repetition number is less than the threshold parameter. The MT may enable the feedback of the HARQ process for the scheduled downlink transmission when the repetition number is greater than or equal to the threshold parameter.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a mobile termination (MT), comprising:

determining whether a first parameter is received from a base station via radio resource control (RRC) signaling, the first parameter comprising a bitmap indicating one or more processes, of a group of hybrid automatic repeat request (HARQ) processes, that are to be in a feedback state of disabled or enabled feedback;

when the first parameter is received, disabling or enabling feedback of the one or more processes according to the bitmap;

receiving, from the base station, downlink control information (DCI) scheduling a downlink transmission, the DCI including a DCI parameter in a re-interpreted DCI field, wherein the DCI parameter indicates to disable or enable feedback of a first HARQ process for the downlink transmission; and when the first parameter is received, maintaining or reversing a feedback state of the first HARQ process, configured by the bitmap, based on the DCI parameter, wherein a first state of the re-interpreted DCI field indicates disabling feedback and states other than the first state indicate enabling feedback.

2. The method of claim 1, further comprising:

when the first parameter is not received, disabling or enabling the feedback of the first HARQ process according to the DCI parameter.

3. The method of claim 1, wherein the re-interpreted DCI field is "HARQ-ACK resource" field for Narrowband Internet of Things (NB-IoT) communications and is "HARQ-ACK resource offset" field for enhanced Machine Type Communications coverage enhancement mode B (eMTC CEModeB) communications.

4. The method of claim 1, wherein the DCI parameter does not apply to a HARQ process for acknowledging reception of Msg4.

5. The method of claim 1, further comprising:

receiving, from the base station, a second parameter configured via RRC signaling, the second parameter indicating whether the first parameter comprising a bitmap is overridden by the DCI parameter indicating enabling or disabling feedback of a particular HARQ process or whether the DCI parameter is utilized.

6. The method of claim 5, wherein the first and second parameters are transmitted in a MSG4, a NPDSCH-Config-NB field for NB-IoT, or a PDSCH-Config field for eMTC.

7. The method of claim 5, wherein the first parameter and the second parameter are updatable by MAC CE or updatable by RRC signaling when the MT is in NB-IoT User Plane mode or in eMTC RRC connected state.

8. The method of claim 1, wherein each bit of the bitmap corresponds to a respective process of the group of HARQ processes, wherein an adjacent bit to the right of a given bit of in the bitmap corresponds to a HARQ process ID that is higher than a HARQ process ID corresponding to the given bit.

9. The method of claim 1, further comprising:

receiving, from the base station, a threshold parameter configured via RRC signaling;

receiving, from the base station, DCI scheduling a downlink transmission and including a repetition number; and disabling feedback of a HARQ process for the scheduled downlink transmission when the repetition number is less than the threshold parameter.

10. The method of claim 9, further comprising:

enabling feedback of the HARQ process for the scheduled downlink transmission when the repetition number is greater than or equal to the threshold parameter.

11. The method of claim 1, wherein feedback for a HARQ process for acknowledging reception of Msg4 is always enabled and the bitmap of the first parameter does not apply to the HARQ process for acknowledging reception of Msg4.

12. A method of wireless communication of a mobile termination (MT), comprising:

determining whether a first parameter is received from a base station via radio resource control (RRC) signaling, the first parameter comprising a bitmap indicating one or more processes, of a group of hybrid automatic repeat request (HARQ) processes, that are to be in a feedback state of disabled or enabled feedback;

when the first parameter is received, disabling or enabling feedback of the one or more processes according to the bitmap; and receiving, from the base station, downlink control information (DCI) scheduling a downlink transmission, the DCI including a DCI parameter that indicates to disable or enable feedback of a first HARQ process for the downlink transmission;

wherein the DCI parameter is in a re-interpreted DCI field with another parameter;

wherein the re-interpreted DCI field is "HARQ-ACK resource" field for Narrowband Internet of Things (NB-IoT) communications and is "HARQ-ACK resource offset" field for enhanced Machine Type Communications coverage enhancement mode B (eMTC CEModeB communications;

wherein a first value in the "HARQ-ACK resource offset" indicates disabling feedback of the first HARQ process and other values in the "HARQ-ACK resource offset" field indicate enabling feedback of the first HARQ process.

13. The method of claim 12, further comprising:

when the first parameter is not received, disabling or enabling the feedback of the first HARQ process according to the DCI parameter.

14. A method of wireless communication of a mobile termination (MT), comprising:

determining whether a first parameter is received from a base station via radio resource control (RRC) signaling, the first parameter comprising a bitmap indicating one or more processes, of a group of hybrid automatic repeat request (HARQ) processes, that are to be in a feedback state of disabled or enabled feedback;

when the first parameter is received, disabling or enabling feedback of the one or more processes according to the bitmap; and receiving, from the base station, downlink control information (DCI) scheduling a downlink transmission, the DCI including a DCI parameter that indicates to disable or enable feedback of a first HARQ process for the downlink transmission;

wherein the DCI parameter is in a re-interpreted DCI field with another parameter;

wherein the re-interpreted DCI field is "HARQ-ACK resource" field for Narrowband Internet of Things (NB-IoT) communications and is "HARQ-ACK resource offset" field for enhanced Machine Type Communications coverage enhancement mode B (eMTC CEModeB communications;

wherein a first value in the "HARQ-ACK resource" indicates disabling feedback of the first HARQ process and other values in the "HARQ-ACK resource" field indicate enabling feedback of the first HARQ process.

15. The method of claim 14, further comprising:

when the first parameter is not received, disabling or enabling the feedback of the first HARQ process according to the DCI parameter.

16. An apparatus for wireless communication, the apparatus being a mobile termination (MT), comprising:

a memory; and at least one processor coupled to the memory and configured to:

determine whether a first parameter is received from a base station via radio resource control (RRC) signaling, the first parameter comprising a bitmap indicating one or more processes, of a group of hybrid automatic repeat request (HARQ) processes, that are to be in a feedback state of disabled or enabled;

when the first parameter is received, disable or enable feedback of the one or more processes according to the bitmap;

receive, from the base station, downlink control information (DCI) scheduling a downlink transmission, the DCI including a DCI parameter in a re-interpreted DCI field, wherein the DCI parameter indicates to disable or enable feedback of a first HARQ process for the downlink transmission; and when the first parameter is received, maintain or reverse a feedback state of the first HARQ process, configured by the bitmap, based on the DCI parameter, wherein a first state of the re-interpreted DCI field indicates disabling feedback and states other than the first state indicate enabling feedback.

17. The apparatus of claim 16, wherein the re-interpreted DCI field is "HARQ-ACK resource" field for Narrowband Internet of Things (NB-IoT) communications and is "HARQ-ACK resource offset" field for enhanced Machine Type Communications coverage enhancement mode B (eMTC CEModeB) communications.

18. A non-transitory computer-readable medium storing computer executable code for wireless communication of a user equipment (UE), comprising code to:

determine whether a first parameter is received from a base station via radio resource control (RRC) signaling, the first parameter comprising a bitmap indicating one or more processes, of a group of hybrid automatic repeat request (HARQ) processes, that are to be in a feedback state of disabled or enabled;

when the first parameter is received, disable or enable feedback of the one or more processes according to the bitmap;

receive, from the base station, downlink control information (DCI) scheduling a downlink transmission, the DCI including a DCI parameter in a re-interpreted DCI field, wherein the DCI parameter indicates to disable or enable feedback of a first HARQ process for the downlink transmission; and when the first parameter is received, maintain or reverse a feedback state of the first HARQ process, configured by the bitmap, based on the DCI parameter, wherein a first state of the re-interpreted DCI field indicates disabling feedback and states other than the first state indicate enabling feedback.

* * * * *